United States Patent [19]

Tokunaga

[11] Patent Number: 4,659,924
[45] Date of Patent: Apr. 21, 1987

[54] ROTARY ENCODER WHEREIN PHASE DIFFERENCE IS ADJUSTED BY THE RADIAL POSITION OF THE SENSOR HEAD

[75] Inventor: Ichiro Tokunaga, Furukawa, Japan

[73] Assignee: Alps Electric Co., Ltd., Japan

[21] Appl. No.: 708,717

[22] Filed: Mar. 6, 1985

[30] Foreign Application Priority Data

Mar. 6, 1984 [JP] Japan ............................. 59-31218[U]

[51] Int. Cl.⁴ .............................................. G01D 5/34
[52] U.S. Cl. ........................ 250/231 SE; 250/237 G
[58] Field of Search ............ 250/231 SE, 237 G, 239; 356/395; 340/347 P; 33/125 C

[56] References Cited

U.S. PATENT DOCUMENTS 3,894,232  7/1975  Laspesa ........................ 250/231 SE
3,902,063  8/1975  Oelsch et al. ................. 250/231 SE
4,031,441  6/1977  Garrett ........................ 250/231 SE Primary Examiner—David C. Nelms
Assistant Examiner—William L. Oen
Attorney, Agent, or Firm—Guy W. Shoup

[57] ABSTRACT

A rotary encoder comprises a code disk provided with a number of strip-like reflection portions circumferentially equidistantly formed and radially extended on one surface of the code; and a sensor head constituted by a light emitting portion and a pair of light receiving portions provided at the opposite sides of the light emitting portion respectively, the sensor head being disposed such that the light emitting and receiving end surface thereof is in opposition to the one surface of the code disk, the sensor head being supported movably in the radial direction relative to the code disk.

6 Claims, 5 Drawing Figures

4,659,924

ROTARY ENCODER WHEREIN PHASE DIFFERENCE IS ADJUSTED BY THE RADIAL POSITION OF THE SENSOR HEAD

BACKGROUND OF THE INVENTION

1. Field of the Invention

The present invention generally relates to rotary encoders and more particularly to a rotary encoder employing a sensor head having a light emitting portion and a pair of light receiving portions respectively disposed on the both sides of the light emitting portion.

2. Description of the Prior Art

FIG. 1 shows an example of such a rotary encoder of the type as described above, in which there are provided a light output optical fiber 1 connected to a light emission element such as a light emission diode (LED)(not shown) to constitute a light emission portion, and a pair of light receiving optical fibers 2 each connected to a light receiving element such as a phototransistor (not shown) to constituted a pair of light receiving portions, the respective optical fibers 1 and 2 being bonded such that the respective tip ends of the air of light receiving optical fibers 2 are disposed on the opposite sides of the tip end of the light output optical fiber 1 to constitute a sensor head 3 with its end surface disposed in opposition to the peripheral surface of a code disk 4.

In such a rotary encoder, the light receiving element produces a high level output pulse signal when one of strip-like reflection portions 5 formed on the periphery of the code disk 4 comes in an effective reflection range formed under the bonded portion of the optical fibers 1 and 2, while produces a low level output pulse signal when one of non-reflection portions 6 formed on the periphery of the code disk 4 comes in the above-mentioned effective reflection range. The number of the thus produced high and low level pulse signals are counted to thereby detect the rotational speed of the code disk 4.

In such a rotary encoder, in order to not only detect rotational speed of the code disk 4 but detect the direction of rotation of the code disk 4 or enhance the resolution, it is preferable to provide a predetermined phase difference between the respective output waveforms of the light receiving elements connected to the pair of light receiving optical fibers 2. The sequence of generation of the respective waveforms is reversed when the code disk 4 rotates reversely, whereby the rotational direction of the code disk 4 can be detected. If the two waveforms of A- and B-phase are superimposed, with a phase difference of 90 degrees therebetween, there exist in one pitch four kinds of signal states as the combination of the phases A and B, that is a first state of (high level) and H, a second state of H and L (low level), a third state of L and H, and a fourth state L and L, so that the signal can be made to be quadruple in its state of level.

There was a disadvantage in this conventional case, however, that accuracy is required for the width of each of the optical fibers 1 and 2 in order to cause the phase difference between the two waveforms to fall within a predetermined range, resulting in complication in manufacturing.

SUMMARY OF THE INVENTION

It is therefore an object of the present invention to solve the problems in the prior art.

It is another object of the present invention to provide a rotary encoder in which the above-mentioned phase difference between two output waveforms can be easily adjusted to a desired value.

In order to attain the objects, according to the present invention, the rotary encoder which comprises a code disk provided with number of strip-like reflection portions circumferentially equidistantly formed and radially extended on one surface of the code; and a sensor head constituted by a light emitting portion and a pair of light receiving portions provided at the opposite sides of the light emitting portion respectively, the sensor head being disposed such that the light emitting and receiving end surface thereof is in opposition to the one surface of the code disk, the sensor head being supported movably in the radial direction relative to the code disk.

Other objects, features and advantages will be apparent when read the following description in conjunction with the accompanying drawings.

DETAILED DESCRIPTION OF PREFERRED EMBODIMENT

Figure 1:
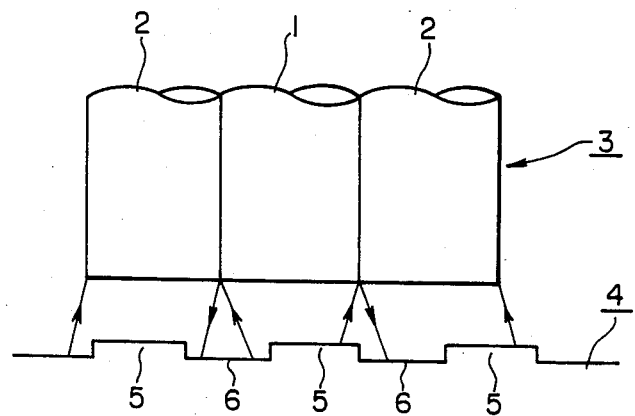
FIG. 1 is a side view showing the relation between the code disk and the sensor head.
Figure 2:
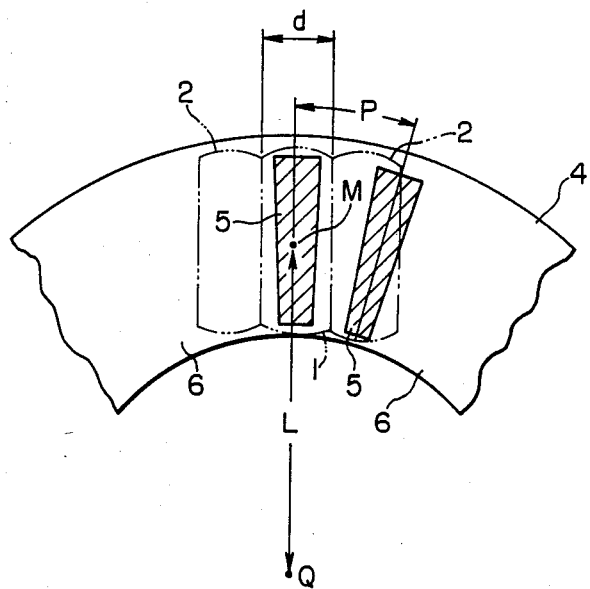
FIG. 2 is an upper view showing the relation between the code disk and the sensor head according to the present invention.
Figure 3:
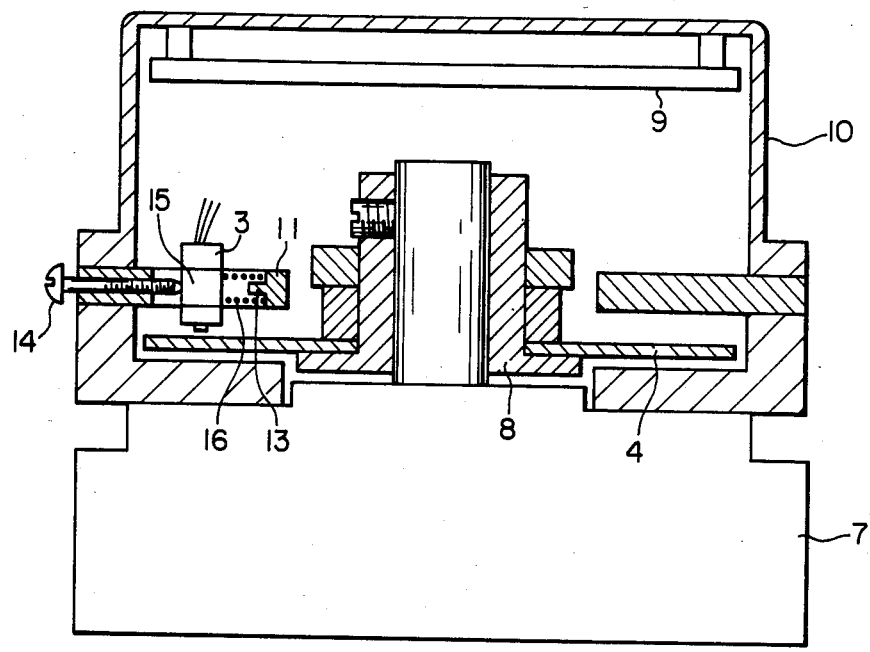
FIG. 3 is a fragmentary cross-section showing an embodiment of the adjustment device of the sensor head according to the present invention.
Figure 4:
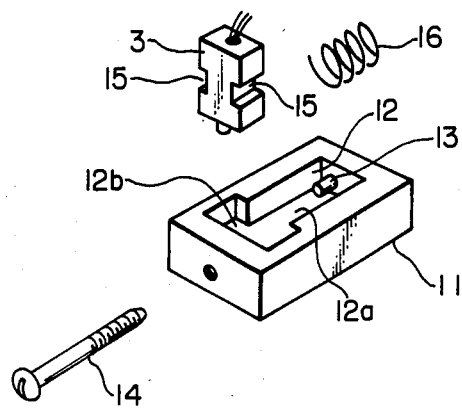
FIG. 4 is an exploded perspective view of the main part of the embodiment.

Referring to FIGS. 2 to 5, a preferred embodiment of the present invention will be described hereunder. In these drawings, the same component as that in FIG. 1 is designated by the same reference numeral as used in FIG. 1.

Reflection portions 5 and non-reflection portions 6 are alternately formed on the circumferential portion on one surface of a code disk 4 at a predetermined pitch p. A sensor head 3 is constituted by a light emitting portion 1 and a pair of light receiving portions 2 connected with the light emitting portion 1 at the opposite sides thereof respectively. The sensor head 3 is disposed such that the end surface thereof is in opposition to the circumferential portion on the surface of the code disk 4.

The code disk 4 is fixed on a holder 8 connected to an electric motor 7 so as to be rotatable in the desired direction. The sensor head 3 is held by a holder 11 fixed on a frame 10 holding a circuit substrate 9, etc. That is, a T-shaped through hole 12 is formed in the holder 11 substantially at a center portion thereof. A small protrusion 13 is formed on the bottom portion of a narrow width portion 12a of the through hole 12 and an adjustment screw 14 is axially adjustably screwed into a wide width portion 12b for the outside thereof. A pair of grooves 15 are formed at the opposite sides of the integrated body of the sensor head 3 constituted by a light output optical fiber constituting the light emitting portion 1 and a pair of light receiving optical fibers constituting the light receiving portion 2 and being integrally bonded with the light output optical fiber. The sensor head 3 is fed by the screw 14 from the wide width portion 12b to the narrow width portion 12a in the through hole 12, and when the sensor head 3 has reached the narrow width portion it becomes slidable by being guided by means of the guide grooves 15 and the respective inner opposite sides of the narrow width portion 12a which now engage with the guide grooves 15. The sensor head 3 contacts with the adjustment screw 14 at its one side and is always urged toward the screw 14 at its other side by a spring 16 which is prevented from coming off by the above-mentioned small protrusion 13.

Accordingly, the radial position of the sensor head 3 relative to the code disk 4 can be adjusted by adjusting the amount of projection of the adjustment screw 14 into the holder 11.

Figure 5:
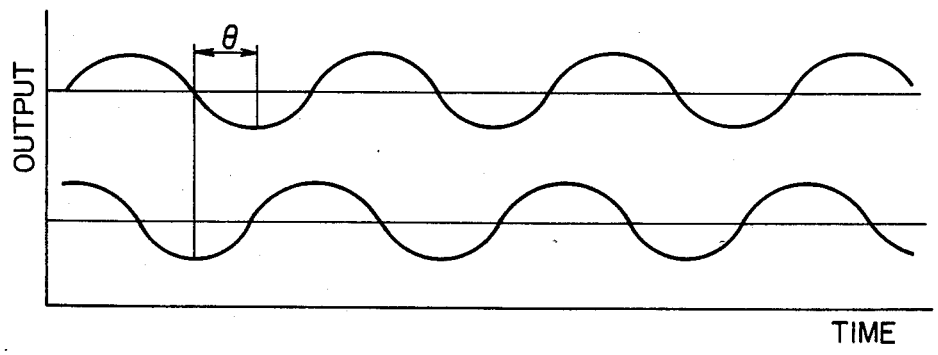
FIG. 5 is a diagram showing the output waveforms.

Generally, the phase difference $\theta$ between the two output waveforms produced from the two light receiving optical fibers 2 as shown in FIG. 5 is simply obtained by the following equation:

$$\theta = d/p \times 360°$$

where d represents the width of each of the optical fibers 1 and 2 of the sensor head 3, and p represents the pitch of arrangement of the reflection portions 5 of the code disk 4.

In this equation, however, if the factor of change in radial movement of the sensor head 3 relative to the code disk 4 is additionally considered, the following equation can be obtained:

$$\theta' = nd/(L \cdot \pi) \times 360°$$

where n represents the resolution number, and L a distance between the center of the code disk 4 and the center M of the sensor head 3. Thus, the phase difference can be desiredly adjusted by suitably moving the sensor head 3 radially relative to the code disk 4.

In the thus arranged rotary encoder according to the present invention, the phase difference between the respective output waveforms of the pair of light receiving portions of the sensor head can be easily adjusted by moving the sensor head radially relative to the code disk and the accuracy of the detection signal can be improved.

What is claimed is:

1. A rotary encoder comprising:
   a code disk rotatable about an axis in a plane and having a plurality of strip-like reflection portions spaced equidistantly apart by a predetermined pitch on a circumferential part of one surface of said disk in said rotation plane, said strip-like portions extending in a radial direction relative to said rotation axis;
   a sensor head disposed opposite said circumferential part of said one surface of said code disk facing said reflection portions and having a light emitting portion and a pair of light receiving portions on each side of said light emitting portion such that light emitted by said light emitting portion is reflected by said reflective portions and received by said light receiving portions to provide two output signals having a phase difference between them, and
   means for mounting and movably adjusting said sensor head along a radial direction of said one surface relative to said rotation axis such that a predetermined phase difference between the two output signals can be obtained.

2. A rotary encoder according to claim 1, further comprising means for moving said sensor head in the radial direction relative to said code disk.

3. A rotary encoder according to claim 2, in which said sensor head moving means includes a holder fixed relative to said code disk and for movably holding said sensor head, a spring supported by said holder and for always urging said sensor head in the radial direction of said code disk so as to cause said sensor head to come away from the center of rotation of said code disk, and an adjustment screw supported by said holder and for pushing said sensor head against said spring in the radial direction of code disk.

4. A rotary encoder according to claim 3, in which said holder is formed with a slot in which said sensor head is received.

5. A rotary encoder according to claim 4, in which said slot has a T-shape composed of a wide width portion and a narrow width portion connected to said wide width portion, said sensor head having a pair of guide groove portions formed at the opposite sides thereof, said guide grooves being slidably engageable with the inner opposite sides of the narrow width portion of said slot of said holder.

6. A rotary encoder according to claim 1, wherein said portions of said sensor head are arranged in a row normal to a radius of said disk, said sensor portions have a width of d, said reflective portions are n in number, said sensor head has a center a radial distance of L from said rotational axis, and the phase difference obtained between the two output signals is given by: $(nd/L\pi) \times 360°$.

* * * * *